(12) United States Patent
Ikeda

(10) Patent No.: US 7,787,716 B2
(45) Date of Patent: Aug. 31, 2010

(54) POLARIZATION MODE DISPERSION COMPENSATOR, POLARIZATION MODE DISPERSION COMPENSATING METHOD, AND ITS APPLICATION TO OPTICAL COMMUNICATION SYSTEM

(75) Inventor: Kazuhiro Ikeda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 27 days.

(21) Appl. No.: 12/038,426

(22) Filed: Feb. 27, 2008

(65) Prior Publication Data

US 2008/0159739 A1 Jul. 3, 2008

Related U.S. Application Data

(62) Division of application No. 10/522,751, filed as application No. PCT/JP03/09803 on Aug. 1, 2003, now abandoned.

(60) Provisional application No. 60/454,425, filed on Mar. 13, 2003.

(30) Foreign Application Priority Data

Aug. 2, 2002 (JP) .............................. 2002-226388
Jul. 2, 2003 (JP) .............................. 2003-190540

(51) Int. Cl.
*G02B 6/00* (2006.01)
(52) U.S. Cl. .......................................... 385/11; 398/29
(58) Field of Classification Search .................... 385/11, 385/29, 75, 88
See application file for complete search history.

(56) References Cited

U.S. PATENT DOCUMENTS 6,654,103 B2 11/2003 Yu et al.
(Continued)

FOREIGN PATENT DOCUMENTS

JP 2000-356760 12/2000
(Continued)

*Primary Examiner*—Ellen Kim
(74) *Attorney, Agent, or Firm*—Oblon, Spivak, McClelland, Maier & Neustadt, L.L.P.

(57) ABSTRACT

The present invention provides a polarization mode dispersion compensator comprising: a compensating portion which includes a first polarization controller which performs polarization conversion on light propagating along an optical transmission line and a DGD (Differential Group Delay) emulator which adds a DGD to the light which is polarization-converted by said first polarization controller, said compensating portion being for compensating polarization mode dispersion which occurs in the light while the light propagates along the optical transmission line; a second polarization controller for performing polarization conversion on the light, of which the polarization mode dispersion is compensated, so that a state of polarization of the light can be one linear polarization; a polarization beam splitting portion for splitting the light, which is polarization-converted by said second polarization controller, into the one linear polarization and an other linear polarization which is orthogonal to the one linear polarization; an optical-intensity measuring portion for measuring intensity of the other linear polarization; and a controlling portion for controlling said compensating portion and said second polarization controller so that the intensity of the other linear polarization measured by said optical-intensity measuring portion becomes minimized.

5 Claims, 14 Drawing Sheets

U.S. PATENT DOCUMENTS

| | | |
|---|---|---|
| 6,765,723 B1 * | 7/2004 | Savory .................. 359/499 |
| 7,003,183 B1 | 2/2006 | Phua et al. |
| 2003/0072513 A1 | 4/2003 | Glingener et al. |
| 2003/0152320 A1 | 8/2003 | DeBaun et al. |
| 2003/0223056 A1 | 12/2003 | Fu et al. |
| 2003/0223689 A1 | 12/2003 | Koch et al. |
| 2004/0131298 A1 | 7/2004 | Rasmussen et al. |
| 2004/0263973 A1 | 12/2004 | Damask |
| 2005/0168725 A1 | 8/2005 | Kotten et al. |

FOREIGN PATENT DOCUMENTS

| | | |
|---|---|---|
| JP | 2001-136125 | 5/2001 |
| JP | 2001-211120 | 8/2001 |
| JP | 2002-016548 | 1/2002 |

* cited by examiner (a)

(b) state of polarization at $\lambda_0$ (c) state of polarization at $\lambda_1$ (d) state of polarization at $\lambda_2$ (a)

(b) state of polarization at $\lambda_0$ (c) state of polarization at $\lambda_1$ (d) state of polarization at $\lambda_2$ Stokes space Stokes space

POLARIZATION MODE DISPERSION COMPENSATOR, POLARIZATION MODE DISPERSION COMPENSATING METHOD, AND ITS APPLICATION TO OPTICAL COMMUNICATION SYSTEM

CROSS REFERENCE TO RELATED APPLICATIONS

This Division application claims the benefit of priority under 35 U.S.C. §120 for U.S. Ser. No. 10/522,751, filed Jan. 4, 2006, which is a National Stage of PCT/JP03/09803, filed Aug. 1, 2003, which claims benefit of 60/454,425, under 119(e) filed Mar. 13, 2003. This application further claims the benefit of priority under 35 U.S.C. §119 from Japanese Patent Application No. 2002-226388, filed Aug. 2, 2002 and Japanese Patent Application No. 2003-190540, filed Jul. 2, 2003 the entire contents of each is incorporated herein by reference.

TECHNICAL FIELD

The present invention relates to the technical field of optical communication in which information is communicated on an optical signal, and particularly to a polarization mode dispersion compensator having a function of compensating for polarization mode dispersion that occurs in a transmission line of an optical signal, a polarization mode dispersion compensating method thereof and its application to an optical communication system.

BACKGROUND ART

Recently, in the optical communication field, there has been a demand for larger capacity and higher speed in information transmission. In order to meet this demand, various constituent technologies, such as WDM (Wavelength Division Multiplexing) have been studied. In such high-speed, large-capacity optical communication being performed, polarization mode dispersion (PMD), which was a problem conventionally, is noted as a significant parameter for imposing limitations on transmission characteristics of an optical signal. Then, studies are being carried out about a PMD compensator for compensating for the effects of PMD.

There are many propositions made as to the above-mentioned PMD compensator, which are disclosed in a Japanese Laid-Open Patent Publication Nos. H11-196046, 2000-507430 and 2000-031903.

According to the Japanese Laid-Open Patent Publication No. H11-196046, an optical signal transmitted on a transmission line is composed of two orthogonal polarization components called "Principal States of Polarization" (PSP). A polarization mode dispersion compensator disclosed in this publication includes a polarization controller for subjecting these two polarization components to polarization conversion into two orthogonal Eigen States of Polarization (ESP) of a DGD (Differential Group Delay) emulator, detecting means for detecting waveform distortion by polarization mode dispersion of a transmitted optical signal and a controlling device for controlling the operation of the polarization controller with a control signal from the detecting means.

A polarization mode dispersion compensator disclosed in the Japanese Laid-Open Patent Publication No. 2000-507430 is provided with a DGD emulator anterior to a receiver. A DGD of the DGD emulator is a fixed amount and is larger than a polarization mode dispersion which occurs in an optical path including a transmission line between a transmitter and the DGD emulator and a polarization controller. The polarization mode dispersion compensator is configured to detect a DOP (Degree of Polarization) of light output from the DGD emulator and to control a polarization controller so that this DOP represents a maximum value. With such control, either PSP (Principal States of Polarization) of the optical path extending between the transmitter and the receiver and including the transmission line, the polarization controller and the DGD emulator is aligned with a SOP (State Of Polarization) of light transmitted from the transmitter.

A polarization mode dispersion compensator disclosed in the Japanese Laid-Open Patent Publication No. 2000-031903 is similar to that disclosed in the publication No. 2000-507430 in that a DOP is used as a control amount. However, the polarization mode dispersion compensator disclosed in the publication No. 2000-031903 utilizes as DOP detecting means a polarization analyzer as well as a polarization controller and a polarizer as described in the publication No. 2000-507430.

All the above-mentioned related arts are effective only at compensating for first-order polarization mode dispersion. However, when the polarization mode dispersion compensator is actually applied to the transmission line, there exists another problem of compensating for second-order polarization mode dispersion. Means for compensating for this second-order polarization mode dispersion is disclosed for example in OFC2002, WI4, Technical Digest p. 236 (hereinafter referred to as "cited reference 1").

Specifically, a polarization mode dispersion compensator disclosed in the cited reference 1 is configured to be such a polarization mode dispersion compensator as disclosed in the publication No. 2000-507430 being provided with a polarization controller and a polarizer at the latter stage thereof. According to the cited reference 1, an output from the polarizer arranged in the latter stage is maximized to align output polarization from the polarization mode dispersion compensator to linear polarization and remove polarization components other than linear polarization components. With this configuration, a depolarize component, which is one of components caused by second-order polarization mode dispersion, can be removed.

However, in each polarization mode dispersion compensator disclosed in the above-mentioned publications H11-196046, 2000-507430 and 2000-031903, the detecting means provided therein has a complex configuration, which presents a problem of extremely high cost.

Specifically, in the publication No. H11-196046, the intensity of intensity-modulated signal light is directly measured, subjected to photoelectric conversion into an electric signal and then, a part of the intensity-modulated frequency thereof is cut off by an electric filter so as to use its intensity as a control amount. However, this configuration requires a modulation component of very-high frequency component to be detected and subjected to circuit processing. Such electric circuitry is generally complex and very expensive.

In the publication No. 2000-507430, the DOP detecting means has complex configuration including a polarization controller, a polarizer, a power monitor anterior to the polarizer, a power monitor posterior to the polarizer, and an operating circuit for calculating a DOP by comparing power obtained by the power monitor anterior to the polarizer with power obtained by the power monitor posterior to the polarizer. Such DOP calculation is time-consuming, which results in further time-consuming control.

In the publication No. 2000-031903, the polarization analyzer itself is very expensive and time-consuming in DOP calculating.

Then, if the second-order polarization mode dispersion compensating means described in the cited reference 1 is used in each of these complicatedly configured polarization mode dispersion compensators, the configuration of the polarization mode dispersion compensator would be more complicated and inevitably expensive.

On the other hand, a polarization mode dispersion compensator as mentioned above in the related art functions effectively only for a signal wavelength. For this reason, when being applied to a wavelength division multiplexing communication system, such a polarization mode dispersion compensator has to be arranged for each channel, and thus, multiple polarization mode dispersion compensators are to be arranged in a lump. Accordingly, the polarization mode dispersion compensator is desired to be simple in configuration and low in cost for the purpose of widespreading and practical application of such polarization mode dispersion compensators.

Further, the polarization mode dispersion (PMD) is a main factor for deterioration in an optical communication system at 40 Gbps and above. Depending on a PMD amount of the transmission line, it may become a problem also in a 10-Gbps system which utilizes an older fiber (Cited reference [1]: F. Bruyere, Optical fiber Tech., 2, pp. 269-280, 1996). For this reason, many studies have been carried out about PMD compensation (Cited reference [2]: H. Ooi et al., OFC99, WE5-1, P. 86, 1999; Cited reference [3]: T. Takahashi et al., Electron. Lett., 30(4), pp. 348-349, 1994; Cited reference [4]: F. Roy et al., OFC' 99. TuS4-1, P. 275, 1999; Cited reference [5]: C. Francia et al., Photon. Technol. Lett., 10(12), p. 1739, 1998; Cited reference [6]: J. Poirrier et al., OFC2002, W14, P. 236, 2002). These arts are directed to a single wavelength and a single channel, and in order to be actually applied to a multi-wavelength, multi-channel system by wavelength division multiplexing, they must be simple in configuration and inexpensive.

Accordingly, the present invention was carried out in order to solve the above-mentioned conventional problems. It is an object of the present invention to provide a polarization mode dispersion compensator which has detecting means of simple configuration, is allowed to compensate first-order polarization mode dispersion and second-order polarization mode dispersion and is low in cost, a polarization mode dispersion compensating method thereof and its application to an optical communication system.

DISCLOSURE OF INVENTION

An aspect of a polarization mode dispersion compensator of the present invention is a polarization mode dispersion compensator comprising: a compensating portion which includes a first polarization controller which performs polarization conversion on light propagating along an optical transmission line and a DGD (Differential Group Delay) emulator which adds a DGD to the light which is polarization-converted by said first polarization controller, said compensating portion being for compensating polarization mode dispersion which occurs in the light while the light propagates along the optical transmission line; a second polarization controller for performing polarization conversion on the light, of which the polarization mode dispersion is compensated, so that a state of polarization of the light can be one linear polarization; a polarization beam splitting portion for splitting the light, which is polarization-converted by said second polarization controller, into the one linear polarization and an other linear polarization which is orthogonal to the one linear polarization; an optical-intensity measuring portion for measuring intensity of the other linear polarization; and a controlling portion for controlling said compensating portion and said second polarization controller so that the intensity of the other linear polarization measured by said optical-intensity measuring portion becomes minimized.

An aspect of a polarization mode dispersion compensating method according to the present invention is a polarization mode dispersion compensating method comprising the steps of: compensating for polarization mode dispersion which occurs in light which propagates along an optical transmission path by performing polarization conversion on the light and adding a DGD to the light; performing polarization conversion on the light, of which the polarization mode dispersion is compensated, so that a state of polarization of the light can be one linear polarization; splitting the light, which is subjected to polarization conversion, into the one linear polarization and an other linear polarization which is orthogonal to the one linear polarization; measuring intensity of the other linear polarization; and controlling said step of compensating and said step of performing polarization conversion so that the intensity of the other linear polarization measured at the step of measuring becomes minimized.

Another aspect of a polarization mode dispersion compensator of the present invention is a polarization mode dispersion compensator for compensating for polarization mode dispersion that occurs in an optical signal propagating along a transmission line, comprising: a polarization controller for performing polarization conversion on the optical signal input via the transmission line; a fixed PMD (Polarization Mode Dispersion) emulator for adding a fixed PMD to the optical signal which is polarization-converted by said polarization controller; monitoring means for monitoring a state of the optical signal output from said fixed PMD emulator; and controlling means for controlling said polarization controller based on a feedback signal from said monitoring means, wherein the fixed PMD added by said fixed PMD emulator consists of a fixed first-order PMD and a fixed second-order PMD.

According to the present invention, an optical signal propagating via a transmission line is subjected to polarization conversion by the polarization controller and then, is fed a fixed first-order PMD and a fixed second-order PMD by the fixed PMD emulator. Then, a state of the optical signal output from the fixed PMD emulator is monitored by the monitoring means, and the polarization controller is controlled by controlling means based on a feedback signal from the monitoring means. As a result, the effect of PMD of the optical signal is appropriately compensated for, and a first-order PMD as well as a second-order PMD are completely cancelled by the fixed PMD emulator without the necessity to prepare complicated configuration and control.

Still another aspect of a polarization mode dispersion compensator of the present invention is a polarization mode dispersion compensator polarization mode dispersion compensator for compensating for polarization mode dispersion that occurs in an optical signal propagating along a transmission line, comprising: a first polarization controller for performing polarization conversion on the optical signal input via the transmission line; a first fixed PMD emulator for adding only a fixed first-order PMD to the optical signal which is polarization-converted by said first polarization controller; a second polarization controller for performing polarization conversion on the optical signal output from said first fixed PMD emulator; a second fixed PMD emulator for adding only a fixed second-order PMD to the optical signal which is polarization-converted by said second polarization controller; monitoring means for monitoring a state of the optical signal output from said second fixed PMD emulator; and controlling means for controlling said first polarization controller and said second polarization controller based on a feedback signal from said monitoring means.

According to the present invention, an optical signal propagating via a transmission line is subjected to polarization conversion by the first polarization controller and is fed a fixed first-order PMD by the first fixed PMD emulator. Then, the optical signal output from the first PMD emulator is subjected to polarization conversion by the second polarization controller, and is fed a fixed second-order PMD by the second fixed PMD emulator. A state of polarization of the optical signal output from the second fixed PMD emulator is monitored by monitoring means. The first polarization controller and the second polarization controller are controlled by controlling means based on a feedback signal from the monitoring means.

In another aspect of a polarization mode dispersion compensator of the present invention, said fixed PMD emulator may be configured by a plurality of polarization maintaining fibers or uniaxial birefringent crystals coupled with a relative angle formed between axes of eigen states of polarization of the polarization maintaining fibers or the uniaxial birefringent crystals.

In still another aspect of a polarization mode dispersion compensator of the present invention, said first fixed PMD emulator may be one polarization maintaining fiber or one uniaxial birefringent crystal.

In still yet another aspect of a polarization mode dispersion compensator of the present invention, said second fixed PMD emulator may be configured by three or more polarization maintaining fibers or uniaxial birefringent crystals coupled with a relative angle formed between axes of eigen states of polarization of the polarization maintaining fibers or the uniaxial birefringent crystals.

Thus, according to the present invention, each of the PMD emulators as described above may be configured by using a widely available and inexpensive member.

Further, in a polarization mode dispersion compensator of the present invention, when said second fixed PMD emulator is configured by three or more polarization maintaining fibers or uniaxial birefringent crystals coupled with a relative angle formed between axes of eigen states of polarization of the polarization maintaining fibers or the uniaxial birefringent crystals, a fixed polarization converter may be arranged between any two components of said second fixed PMD emulator, said polarization converter having a function of polarization conversion such that a first-order PMD of said second fixed PMD emulator is zero.

Furthermore, a polarization mode dispersion compensator of the present invention may include temperature adjusting means for adjusting temperature of said first fixed PMD emulator or said second fixed PMD emulator.

Furthermore, in a polarization mode dispersion compensator of the present invention, a second PMD canceller including one polarization controller and one polarizer or polarization beam splitter may be arranged at a latter part of the polarization mode dispersion compensator.

BEST MODE FOR CARRYING OUT THE INVENTION

Figure 1:
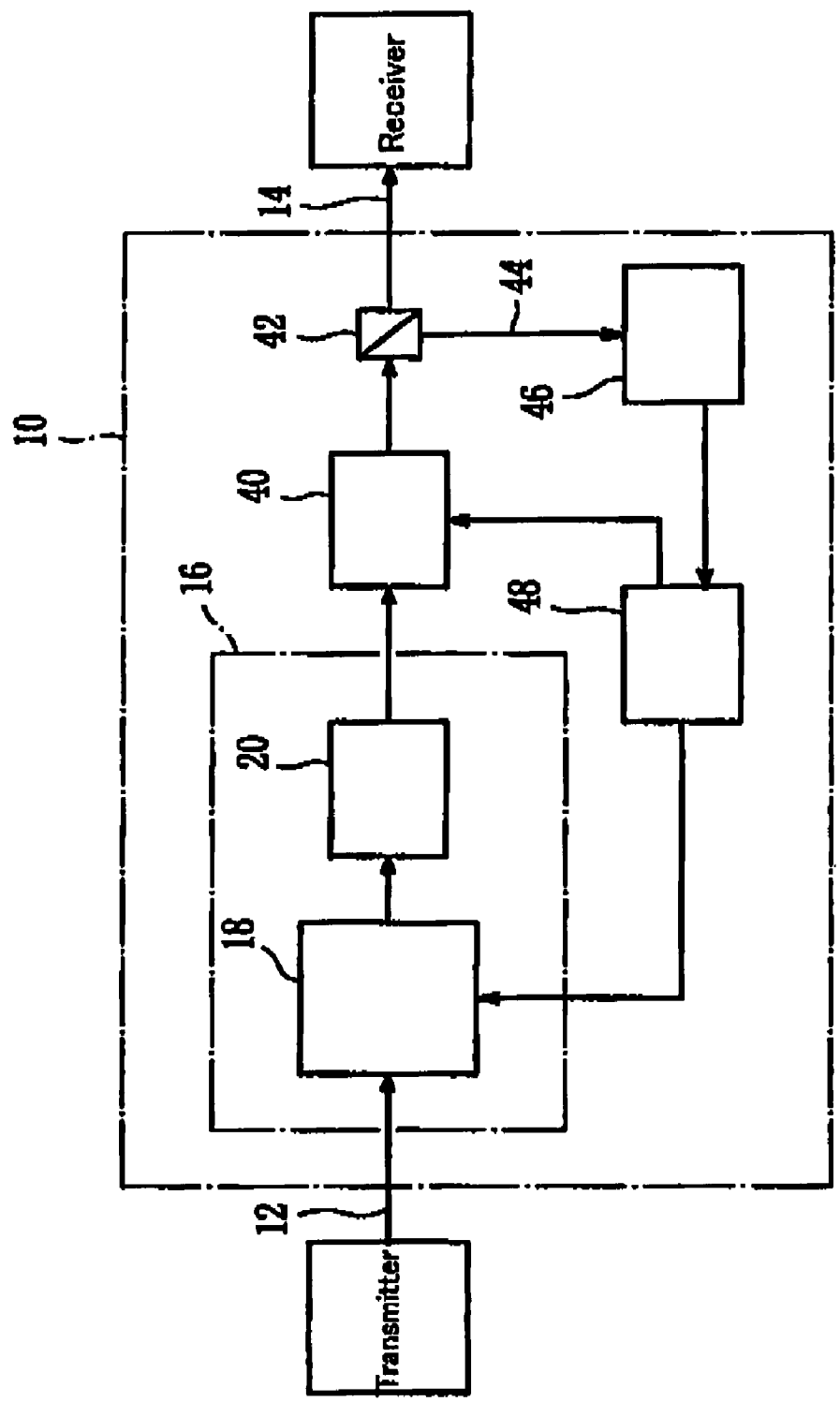
FIG. 1 is a schematic block diagram of a polarization mode dispersion compensator according to an embodiment of the present invention.

FIG. 1 shows one embodiment of a polarization mode dispersion compensator of the present invention (hereinafter referred to simply as "compensator", indicated by 10). The compensator 10 is used to be inserted onto a receiver-side part of an optical transmission line running between a pair of a receiver and a transmitter. More specifically, a light signal is generated by the transmitter and transmitted through an optical fiber 12, which serves as the optical transmission line, to be received by the compensator 10. Then, the compensator 10 compensates for polarization mode dispersion which has occurred in the received light signal when the light signal was propagating via the optical fiber 12. The compensator 10 outputs the compensated light signal onto an optical fiber 14 which extends to the receiver. Since the light signal passes through the compensator 10, the receiver is allowed to receive light of which the polarization mode dispersion of the optical fiber 12 is compensated for.

The compensator 10 includes a compensating portion 16, which has a first polarization controller 18 optically coupled to the optical fiber 12 and a differential group delay emulator (hereinafter referred to as "DGD emulator", indicated by 20) optically coupled to the first polarization controller.

The first polarization controller 18 can be any publicly known polarization controller that enables light which propagates via the optical fiber 12 and is output from the optical fiber 12, or, in other words, light inputted to the polarization controller 18, to be polarization-converted into light with a desired state of polarization to be outputted.

The DGD emulator 20 consists of a polarization maintaining fiber. The polarization maintaining fiber has two eigen states of polarization orthogonal to each other. Each of the eigen states of polarization is linear polarization parallel to the fast axis or the slow axis of the polarization maintaining fiber. Then, the DGD emulator 20 generates a DGD corresponding to refractive indexes of the fast axis and the slow axis and the length of the polarization maintaining fiber to between the two eigen states of polarization.

Used as the DGD emulator can be a birefringent crystal as well as the polarization maintaining fiber (PMF). Here, the polarization maintaining fiber and the birefringent crystal can serve as a DGD emulator which generates a fixed amount of DGD to between eigen states of polarization.

More specifically, the polarization maintaining fiber may be a PANDA fiber, a bow-tie fiber, an elliptic fiber or the like. In addition, the birefringent crystal may be a uniaxial birefringent crystal including rutile (TiO2), Lithium niobate (LiNbO3), Calcite (CaCo3), Barium borates (BaB2O4), Yttrium orthovanadate (YVO4).

Figure 2:
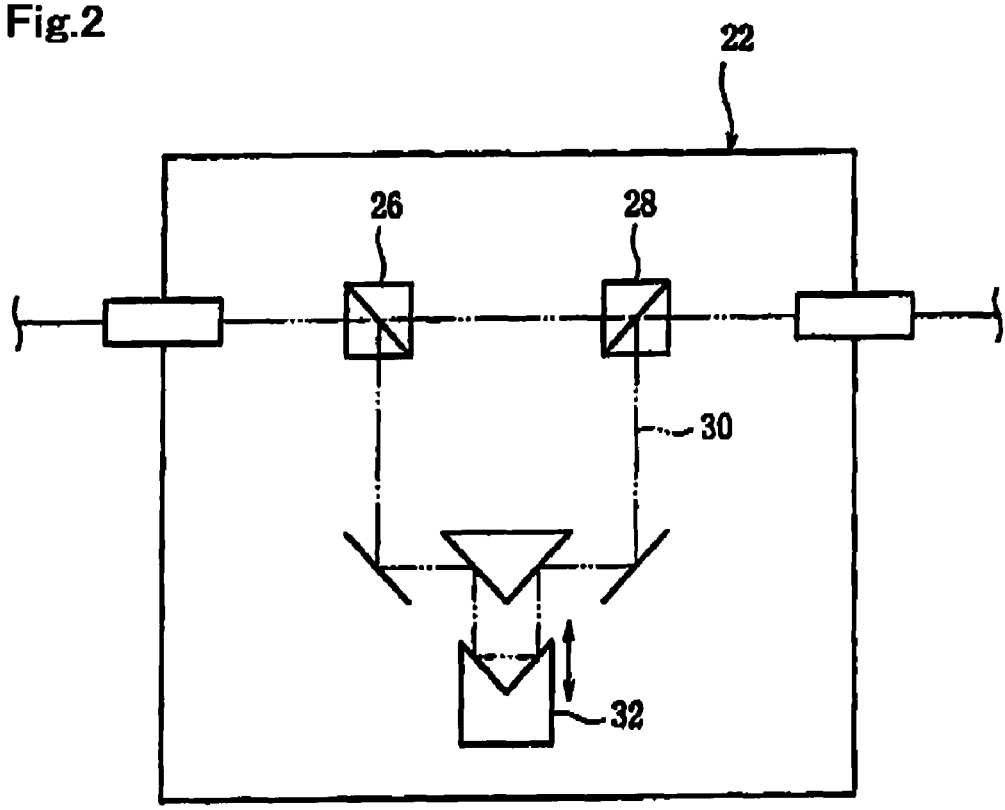
FIG. 2 is a view illustrating a modification of a DGD emulator of the polarization mode dispersion compensator shown in FIG. 1.
Figure 3:
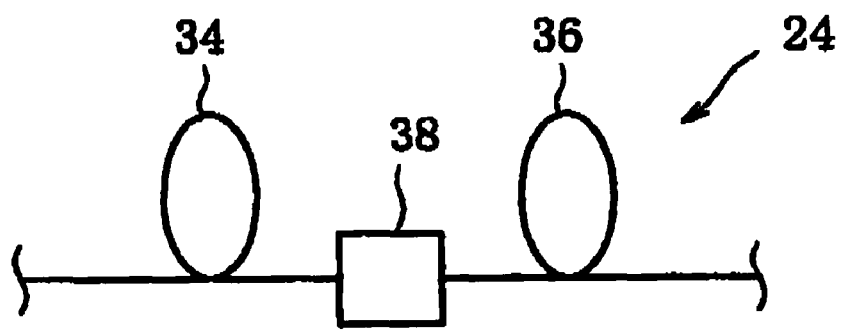
FIG. 3 is a view illustrating another modification of a DGD emulator of the polarization mode dispersion compensator shown in FIG. 1.

Further, the DGD emulator may be a DGD emulator 22 or a DGD emulator 24 shown in FIG. 2 or 3, respectively. These DGD emulators 22 and 24 generate a variable amount of DGD.

Specifically, the DGD emulator 22 shown in FIG. 2 has optical paths running between two polarization beam splitters 26 and 28, one of which is a delay optical path 30. The path length of the delay optical path 30 varies as a moving mirror 32 moves in the direction of the arrow in the figure. Inserted onto the other optical path running between the two polarization beam splitters 26 and 28 is a variable attenuator, if necessary.

In the DGD emulator 24 shown in FIG. 3, a polarization rotator 38 is interposed between two polarization maintaining fibers 34 and 36, and a rotational angle of this polarization rotator 38 is variable.

An edge of the polarization maintaining fiber of the DGD emulator 20 is optically coupled to a second polarization controller 40. The second polarization controller 40 may be any publicly known polarization controller that can outputs light of any state of polarization as light having linear polarization in a particular direction.

The second polarization controller 40 is optically coupled to a polarization beam splitting portion 42, which is configured of a polarization beam splitter. The polarization beam splitting potion 42 splits incident light into two light beams of linear polarization which are orthogonal to each other to be outputted. Then, the second polarization controller 40 performs polarization conversion in such a manner that light output from the DGD emulator 20 becomes parallel to one of the light beams of linear polarization.

The polarization beam splitting portion 42 can be formed of a birefringent crystal or the like, other than a polarization beam splitter which is formed by combining prisms. Specifically, a birefringent crystal used in the polarization beam splitting portion 42 can be a uniaxial birefringent crystal including rutile (TiO2), Lithium niobate (LiNbO3), Calcite (CaCo3), Barium borates (BaB2O4), Yttrium orthovanadate (YVO4).

Optically coupled to the polarization beam splitting portion 42 are a starting edge of an optical fiber 14 into which a light beam of linear polarization outputted from the polarization beam splitting portion 42 is inputted and a starting edge of an optical fiber 44 into which the other light beam of linear polarization is inputted. Here, the optical fiber 14 is arranged with respect to the polarization beam splitting portion 42 in such a manner that a light beam of linear polarization from the second polarization controller 40 is inputted to the starting edge of the optical fiber 14.

The optical fiber 14 extends to the receiver while the optical fiber 44 extends to an optical-intensity measuring portion 46. The optical-intensity measuring portion 46, which is optically coupled to an edge of the optical fiber 44, measures the intensity of light outputted from the edge of the optical fiber 44. Then, the measurement result is inputted to a controller 48 electrically connected to the optical-intensity measuring portion 46.

The controller 48 is electrically connected to the compensating portion 16 and the second polarization controller 40 and controls the compensating portion 16 and the second polarization controller 40 based on the optical intensity (power) measured by the optical-intensity measuring portion 46.

Specifically, the controller 48 controls polarization conversion by the first polarization controller 18 and polarization conversion by the second polarization controller 40 in such a manner that the optical intensity measured by the optical-intensity measuring portion 46 becomes minimized. When the DGD emulator 20 is replaced with the DGD emulator 22 or 24 which generates a variable DGD, the controller 48 controls, in addition to the polarization conversion of the first and second polarization controllers 18 and 40, a DGD generated by the DGD emulators 22 and 24 in such a manner that the optical intensity measured by the optical-intensity measuring portion 46 becomes minimized.

Next description will be made about the operation of the compensator 10.

A light beam propagating via the optical fiber 12 consists of two principal states of polarization which are orthogonal to each other, and there is polarization mode dispersion between these principal states of polarization. Here, the principal states of polarization and the polarization mode dispersion between them vary momently as the state of the optical fiber 12 changes due to stress or the like imposed on the optical fiber 12, for example.

In the compensator 10, the controller 48 controls the compensating portion 16 and the second polarization controller 40 in accordance with a compensating method, which will be described later, in such a manner that the optical intensity measured by the optical-intensity measuring portion 46 becomes minimized. By such control, the polarization of the optical fiber 12 is compensated for.

Minimization of the optical intensity measured by the optical-intensity measuring portion 46 means, from the aspect of control on the compensating portion 16, that polarization mode dispersion of a light beam inputted to the compensating portion 16 is compensated for to output the light as a light beam of high DOP (Degree of Polarization). The light beam of high DOP is subjected to polarization conversion into a linear polarization beam of high DOP by the second polarization controller 40 so that the intensity of the linear polarization light beam measured by the optical-intensity measuring portion 46 becomes minimized.

In this way, in the compensator 10, the second polarization controller 40, the polarization beam splitting portion 42 and the optical-intensity measuring portion 46 carry out a function of detecting means in the feedback control. In the compensator 10, a light beam output from the second polarization controller 40 is not split simply at a predetermined intensity ratio by using an optical tap or the like. However, the light beam is split by the polarization beam splitting portion 42 by utilizing the optical intensity as a control amount which should be ideally zero, thereby realizing detecting means with a simple configuration. Consequently, the compensator 10 does not require complicatedly configured polarization analyzer, electric circuit for analyzing an intensity-modulated spectrum or the like. Then, due to the simple configuration, the compensator 10 can be applied to high-bit-rate, momently changing polarization mode dispersion.

Further in the compensator 10, since the polarization beam splitting portion 42 removes a depolarized component, not only the first-order polarization mode dispersion of the optical fiber 12 but also the second-order polarization mode dispersion can be compensated.

On the other hand, in the compensator 10, the second polarization controller 40 is controlled so that the optical intensity of the linear polarization beam inputted into the optical fiber 14 is maximized, which is indispensable to control the compensating portion 16. Then, in the compensator 10, a control amount for controlling the second polarization controller 40 is set to be the same as the control amount of the compensating portion 16 so as to simplify the configuration of the compensator 10.

Figure 4:
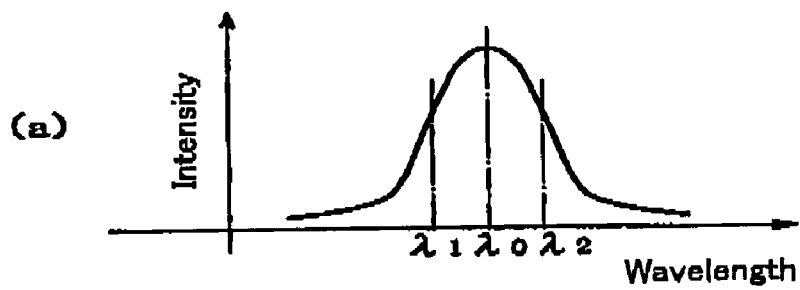
FIG. 4 is an explanatory view of light which is high in DOP.

Light of high DOP is light of which the polarization mode dispersion is small or light of which the polarization mode dispersion is fully compensated for, in which states of polarization of light at different wavelengths included in the spectrum are aligned with each other. This is explained with use of the case where a light beam has a spectral profile with the center wavelength $\lambda 0$ illustrated in FIG. 4($a$) and the state of polarization of light at the center wavelength $\lambda 0$ is linear polarization illustrated in FIG. 4($b$). In this case, the higher the DOP of the light is, the closer the states of polarization of the light at wavelengths $\lambda 1$ and $\lambda 2$ other than the center wavelength $\lambda 0$ in the spectrum are to linear polarization of the light at the center wavelength $\lambda 0$, as illustrated in FIGS. 4($c$) and 4($d$).

In this way, when light of high DOP is subjected to polarization conversion into linearly polarized light by the second polarization controller 40, almost all of the states of polarization in the spectrum are substantially identical to the linear polarization. Accordingly, there occurs almost no linear polarization component that is split to the optical fiber 44 by the polarization beam splitting portion 42, and the optical intensity measured by the optical-intensity measuring portion 46 becomes smaller.

Figure 5:
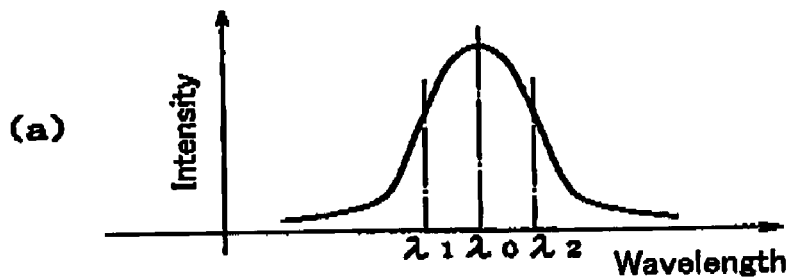
FIG. 5 is an explanatory view of light which is low in DOP.

On the other hand, light of low DOP is light in which large polarization mode dispersion is generated or light of which polarization mode dispersion is not completely compensated for, and when the state of polarization of the light at the center wavelength $\lambda 0$ is linear polarization (refer to FIGS. 5($a$) and 5($b$), the states of polarization of the light at wavelengths $\lambda 1$ and $\lambda 2$ other than the center wavelength $\lambda 0$ included in the spectrum are, for example, elliptical polarization, different from that of the center wavelength $\lambda 0$ (refer to FIGS. 5($c$) and 5($d$).

When such light of low DOP is subjected to polarization conversion into the linearly-polarized light by the second polarization controller 40, the states of polarization become random in the spectrum. Accordingly, there exists a linear polarization component that is split to the optical fiber 44 by the polarization beam splitting portion 42, and the optical intensity measured by the optical-intensity measuring portion 46 becomes larger.

Description below is made about a method for the compensating portion 16 to compensate for the polarization mode dispersion of incident light thereto, by using a Stokes space in which three orthogonal bases are Stokes parameters S1, S2, S3.

Figure 6:
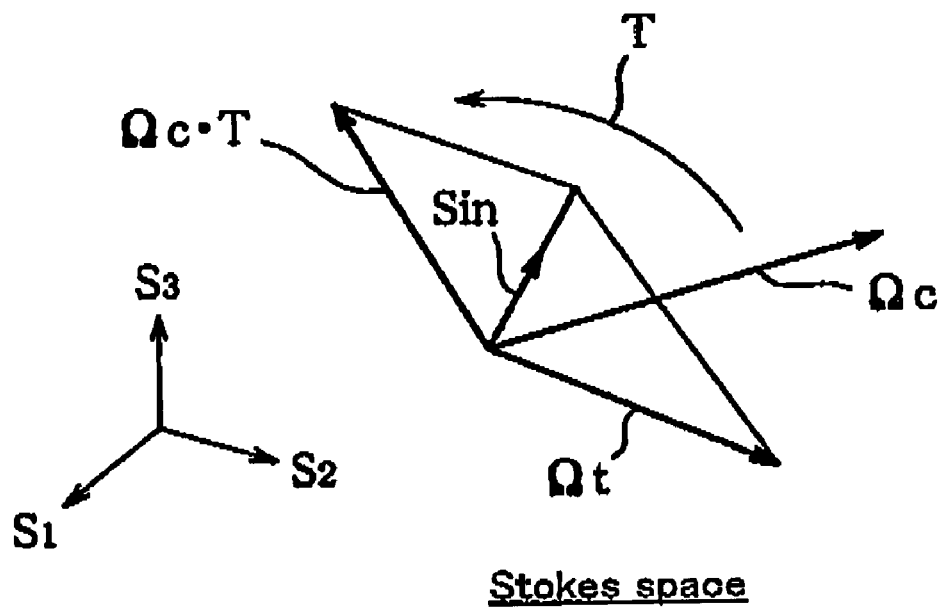
FIG. 6 is an explanatory view of a polarization mode dispersion compensating method in a compensating portion of the polarization mode dispersion compensator shown in FIG. 1.

In the Stokes space, as shown FIG. 6, the state of polarization when a light beam from the transmitter is input into the optical fiber 12 is represented by a vector Sin. The polarization mode dispersion of the optical fiber 12 is represented by a vector $\Omega$t. A DGD generated between two eigen states of polarizations by the DGD emulator 20 is represented by $\Omega$c and the polarization conversion of the polarization controller 18 is represented by conversion matrix T.

The controlling portion 48 controls polarization conversion of the first polarization controller 18 in such a manner that a sum of the vector $\Omega$c·T, which is obtained by converting the vector $\Omega$c by the conversion matrix T, and the vector $\Omega$t is in the same direction of the vector Sin.

With such control, the state of polarization of a light beam when the light beam from the transmitter is input into the optical fiber 12 is aligned with one of the principal states of polarization which are states of polarization orthogonal to each other in the optical path including optical fiber 12 and the compensating portion 16. Since the polarization mode dispersion occurs between the two orthogonal principal states of polarization, polarization mode dispersion does not occur in light which agrees with the one principal state of polarization. Accordingly, such control enables compensation for the polarization mode dispersion of the optical fiber 12.

From geometric consideration, in order that a sum of the vector $\Omega$c·T and the vector $\Omega$t is always in the same direction of the vector Sin, the vector $\Omega$c should be selected to be larger than the vector $\Omega$t in consideration that the vector $\Omega$t can be in any direction based on the state of the optical fiber 12. However, the PMD amount of the optical fiber as transmission line varies due to change in laying conditions of the optical fiber, for example, temperature change, change in lateral pressure, which is shown by a certain probability distribution. An optimal DGD of the DGD emulator 20 with respect to a PMD amount in the probability distribution, taking account of the second-order PMD will be described later. Here, the magnitude of the vector $\Omega$c is a fixed amount corresponding to the DGD of the DGD emulator 20.

Further, when the compensating portion 16 includes, instead of the DGD emulator 20, a DGD emulator 22 or 24 of which a DGD is variable, not only the compensating method described with use of FIG. 6 but also another compensating method described below can be utilized.

Figure 7:
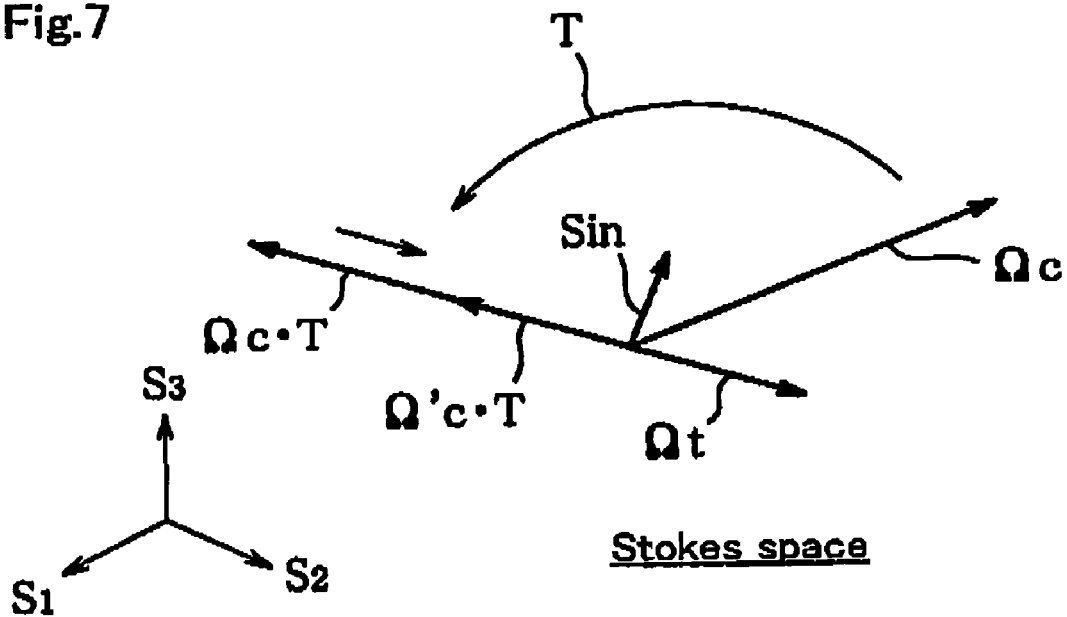
FIG. 7 is an explanatory view of another polarization mode dispersion compensating method in a modification of a compensating portion of the polarization mode dispersion compensator shown in FIG. 1.

In other words, the magnitude of the vector $\Omega$c is variable and the controlling portion 48 controls polarization conversion of the first polarization controller 18 and a DGD of the DGD emulator 22 (24), in such a manner that the length of the vector $\Omega$c is adjusted to be a vector $\Omega$c′ and a sum of the vector $\Omega$c′·T and the vector $\Omega$t becomes zero, which is shown in FIG. 7.

With such control, the slower one of two eigen states of polarization of the DGD emulator 22 (24) is identical with the faster one of the two principal states of polarization of the optical fiber 12, while the faster eigen state of polarization of the DGD emulator 22 (24) is identical with the slower principal state of polarization of the optical fiber 12. At the same time, the DGD of the DGD emulator 22 (24) is made identical with the polarization mode dispersion between the principal states of polarization of the optical fiber 12. In other words, the compensating portion 16 is controlled to present the polarization mode dispersion that is reverse to that of the optical fiber 12 thereby to compensate for the polarization mode dispersion of the optical fiber 12.

Further description will be made about two embodiments of the present invention, in which the present invention is applied to a PMD compensator interposed, near a receiver, between a pair of a transmitter and the receiver, in a transmission line of optical signals.

Figure 8:
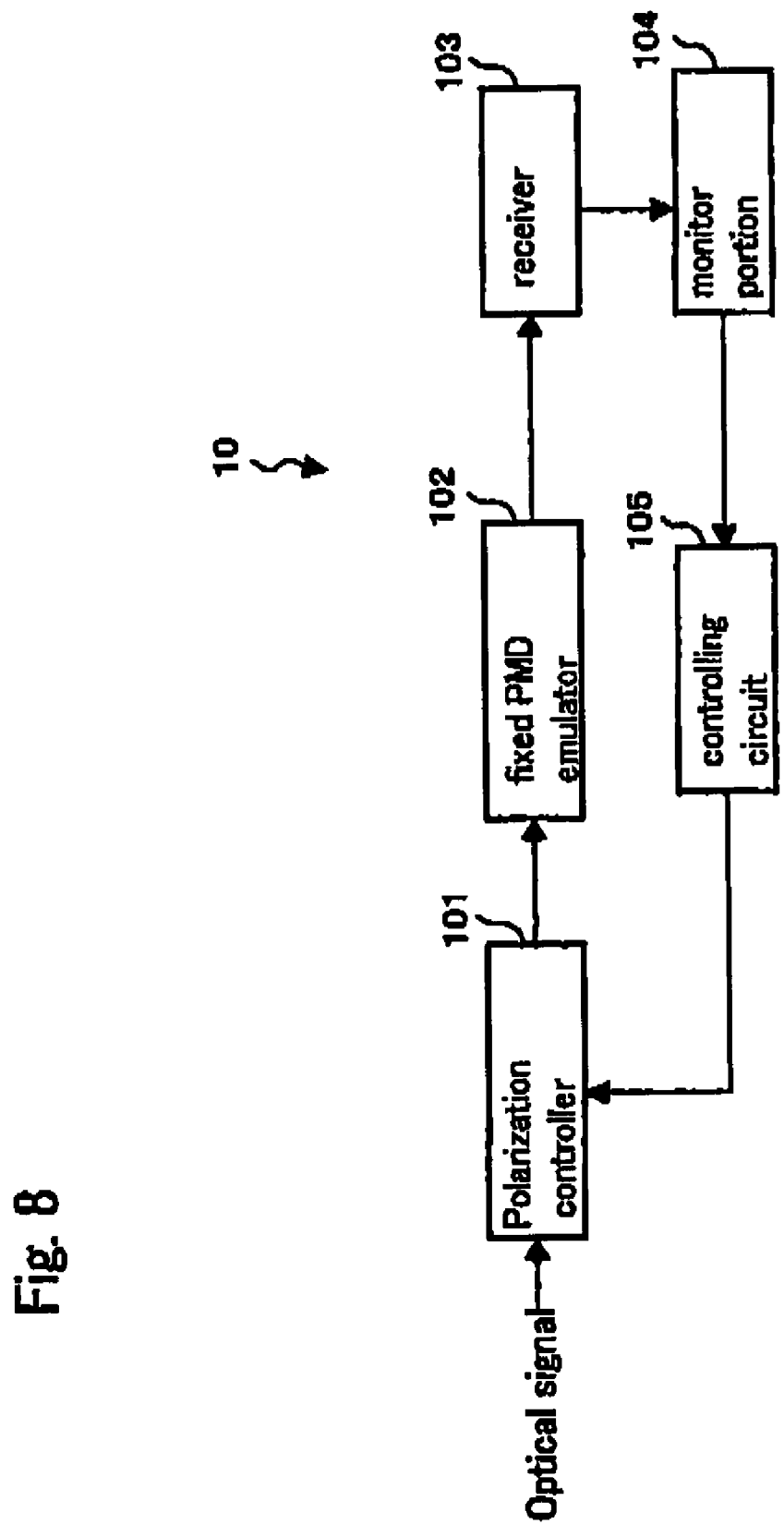
FIG. 8 is a block diagram illustrating a configuration of a PMD compensator according a first embodiment to which the present invention is applied.

FIG. 8 shows a configuration of the PMD compensator 10 according to the first embodiment to which the present invention is applied. As illustrated in FIG. 8, in the first embodiment, the PMD compensator 10 includes a polarization controller 101, a fixed PMD emulator 102, a receiver 103, a monitor portion 104, and a controlling circuit 105.

A light signal is input to the PMD compensator 10 shown in FIG. 8 from the outside via a transmission line including an optical fiber or the like. At this time, the light signal input to the PMD compensator 10 is in a state of having a predetermined PMD amount by DGD occurring between two orthogonal polarization modes in the transmission line (and its frequency dispersion).

In the configuration on FIG. 8, the polarization controller 101 is optically coupled to the transmission line of optical signals. The polarization controller 101 receives a light signal input to the PMD compensator 10, performs polarization conversion control on the light signal based on a control signal which is output from the controlling circuit 105 in response to a feedback signal from the monitor portion 104, as described later, and outputs the light signal with a desired state of polarization.

The fixed PMD emulator 102 is an element for generating and adding a predetermined amount of PMD to a light signal output from the polarization controller 101. In the first embodiment, the fixed PMD emulator 102 includes a first-order PMD component and a second-order PMD component so that both of first-order PMD and second-order PMD can be compensated. Here, specific configuration and operation of the fixed PMD emulator 102 will be described later.

The receiver 103 as receiving means of the present invention receives a light signal output from the fixed PMD emulator 102 and extracts a digital signal. The monitor portion 104 as monitoring means of the present invention monitors a state of PMD of the light signal based on the operation of the receiver 103 and outputs a feedback signal corresponding to the monitoring result.

In the example on FIG. 8, the monitor portion 104 determines an operating state of the receiver 103, such as an error signal, to monitor a state of PMD. However, the monitor portion 104 may be configured to monitor a state of PMD based on an optical signal which is branched from an optical signal output from the fixed PMD emulator 102.

The controlling circuit 105 as controlling means of the present invention receives a feedback signal output from the monitor portion 104 and supplies a control signal based on this feedback signal to the polarization controller 101. With this configuration, since change in the state of PMD of the light signal brings change in the feedback signal, which can be immediately reflected on the operation of controlling the polarization controller 101.

Figure 9A:
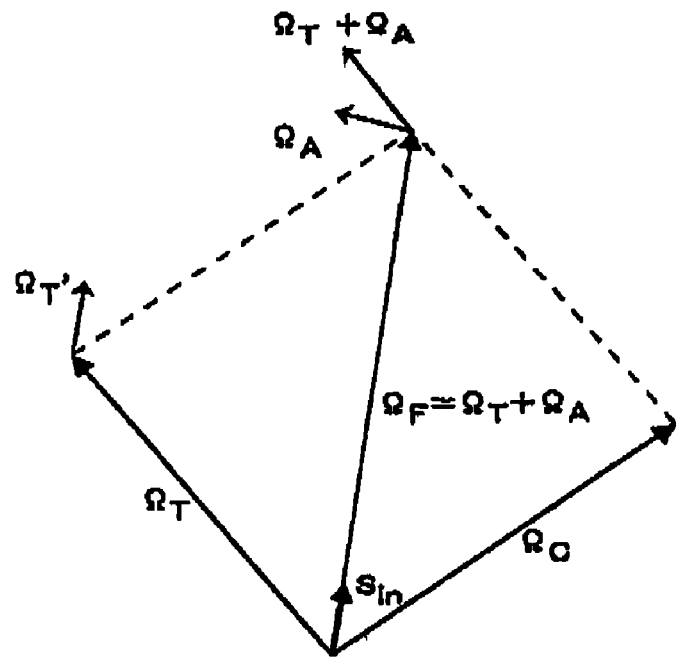
FIGS. 9A and 9B are views each explaining compensation principles by PMD vectors at a fixed PMD emulator of the PMD compensator according to the first embodiment.
Figure 9B:
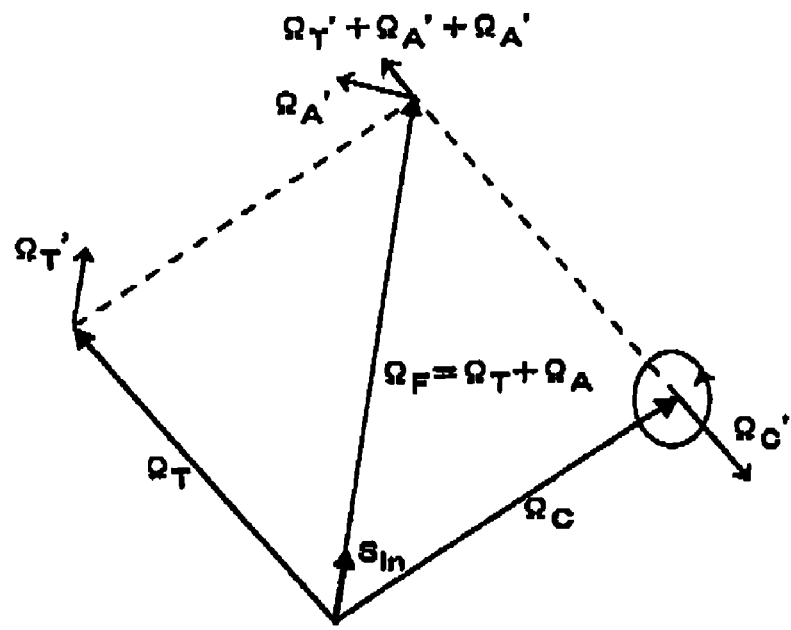

Next, FIGS. 9A and 9B are used to explain the principles of compensation by a PMD vector at the fixed PMD emulator 102. As shown in FIG. 9A, the PMD characteristic in the transmission line for transmitting a light signal can be represented by a first-order PMD vector $\Omega T$ and a second-order OMD vector $\Omega T'$. In FIG. 9A, explanation is made on the condition that the first-order PMD vector and the second-order PMD vector are orthogonal to each other. Although there are in fact parallel components to the PMD vectors, their influence on the transmission characteristic is small, while the orthogonal components affect the transmission characteristic significantly. Accordingly, the PMD compensator 10 according to the present embodiment treats the orthogonal components as a target and neglects the parallel components.

As illustrated in FIG. 9A, when the fixed PMD emulator 102 has only a fixed first-order PMD vector $\Omega c$ component, the PMD compensator 10 can compensate for the affects of the first-order PMD by aligning the direction of the PMD vector $\Omega F$ of the whole system with the direction of the state of polarization Sin of the incident signal light to the transmission line. On the other hand, as the second-order PMD vector $\Omega T'$ is summed with the second-order PMD vector $\Omega A'$ which occurs newly by mode coupling between the PMD compensator 10 and the transmission line, the affects of the second-order PMD vector $\Omega T'$ remains. Since this second-order PMD vector $\Omega A'$ is determined in direction and length based on its relative angle to the first-order PMD vector $\Omega T$ and the first-order PMD vector $\Omega C$, it can not be controlled.

FIG. 9B shows the principles of compensating for the second-order PMD by the fixed PMD emulator 102. As illustrated in FIG. 9B, the fixed PMD emulator 102 has, in addition to the fixed first-order PMD vector $\Omega C$, a fixed second-order PMD vector $\Omega C'$. Then, when it is rotated about the axis of the first-order PMD vector $\Omega C$, compensation for the first-order PMD is unaffected and the direction of the second-order PMD vector $\Omega C'$ can be freely controlled in a plane vertical to the first-order PMD vector $\Omega C$. In such a situation, control can be performed in such a manner that $\Omega T'+\Omega A'+\Omega C'$ is minimized or deterioration of a light signal is suppressed to be minimized, thereby making it possible to suppress the second-order PMD component in the fixed PMD emulator 102.

Figure 10:
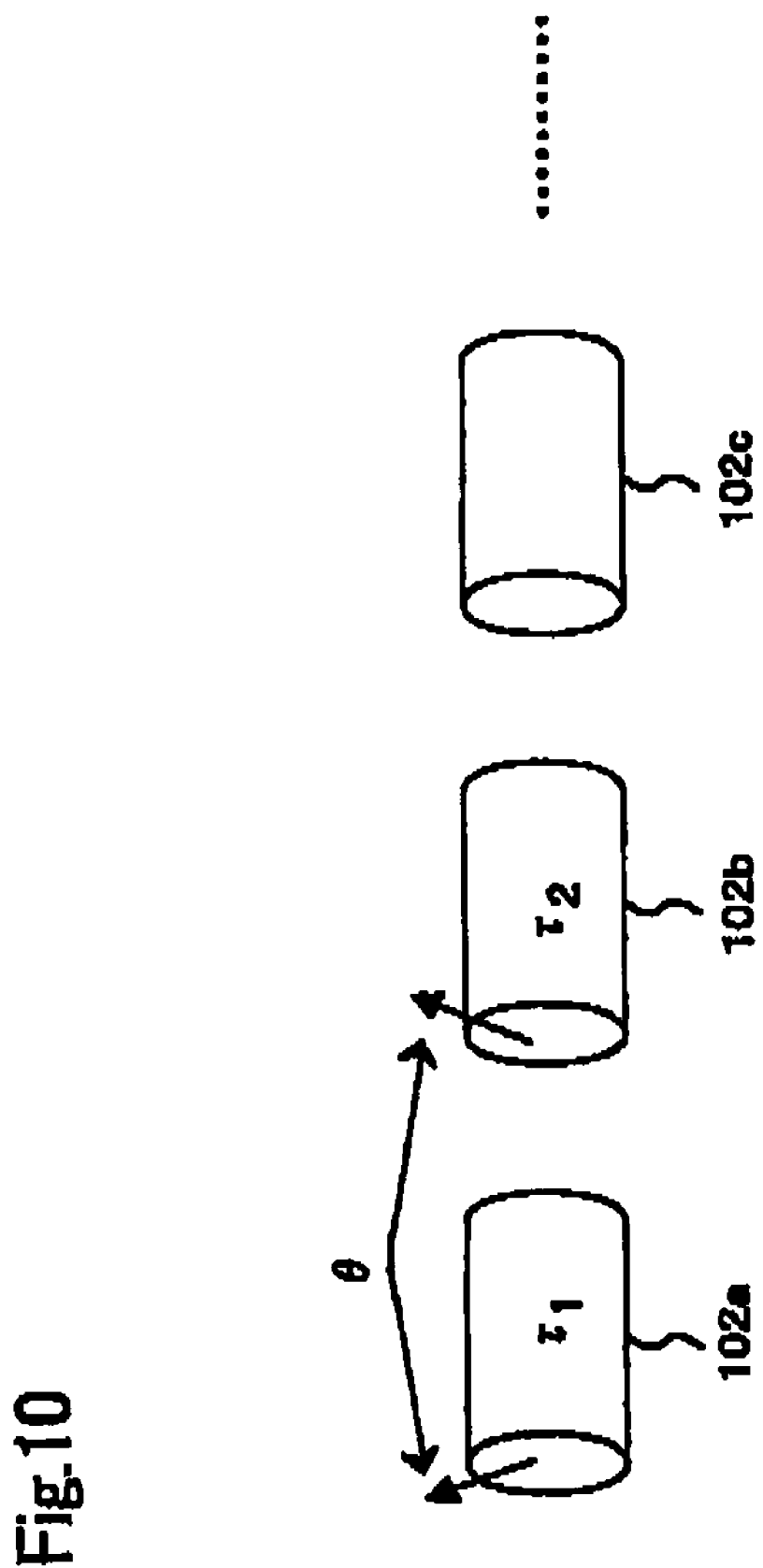
FIG. 10 is a view specifically illustrating a PMD emulator which includes fixed second-order PMD components in the first embodiment.

Next, FIG. 10 shows a specific example of a PMD emulator 102 which includes a fixed second-order PMD component as described above. The PMD emulator 102 can be configured by coupling a plurality of linear birefringence media with a relative angle formed between the axes of the eigen state of polarization. In the example on FIG. 10, the linear birefringence media 102a, 102b, 102c and the like are sequentially coupled at a predetermined relative angles formed therebetween. The linear birefringence medium may be a PMF (Polarization Maintaining Fiber) or a uniaxial birefringent crystal including a rutile crystal.

When the PMD emulator 102 is configured of PMFs, a fusion splicer is used to splice predetermined portions of PMFs with a relative angle formed therebetween. Or, when the PMD emulator 102 is configured of uniaxial birefringent crystals, a collimator is used to once convert output light from a fiber into a parallel beam and pass the beam through the crystals which are disposed with relative angles formed between the crystal optical axes.

When the PMD emulator 102 only generates a second-order PMD component which is orthogonal to a first-order PMD vector, it is enough to use a two-step configuration of linear birefringence media. In this case, DGDs of the respective linear birefringence media are denoted by T1, T2 and a relative angle therebetween is denoted by θ. Then, a first-order PMD amount (DGD) and a second-order PMD amount (SOPMD) are expressed by the following equations.

$$<DGD>=(\tau1^2+\tau2^2+2\tau1\tau2 \cos 2\theta)^{1/2} [ps]$$

$$<SOPMD>=\tau1\tau2 \sin 2\theta \ [ps^2]$$

The DGD and SOPMD expressed by the above-mentioned equations can be selected so as to adapt to a transmission line to which the PMD compensator 10 according to the present embodiment is applied. Specifically, the probability density distributions of the DGD and SOPMD are used to select optimal values which present best behaviors according to the statistics, and $\tau 1$, $\tau 2$, and $\theta$ can be determined so that the DGD and SOPMD may be optimal values.

Figure 11:
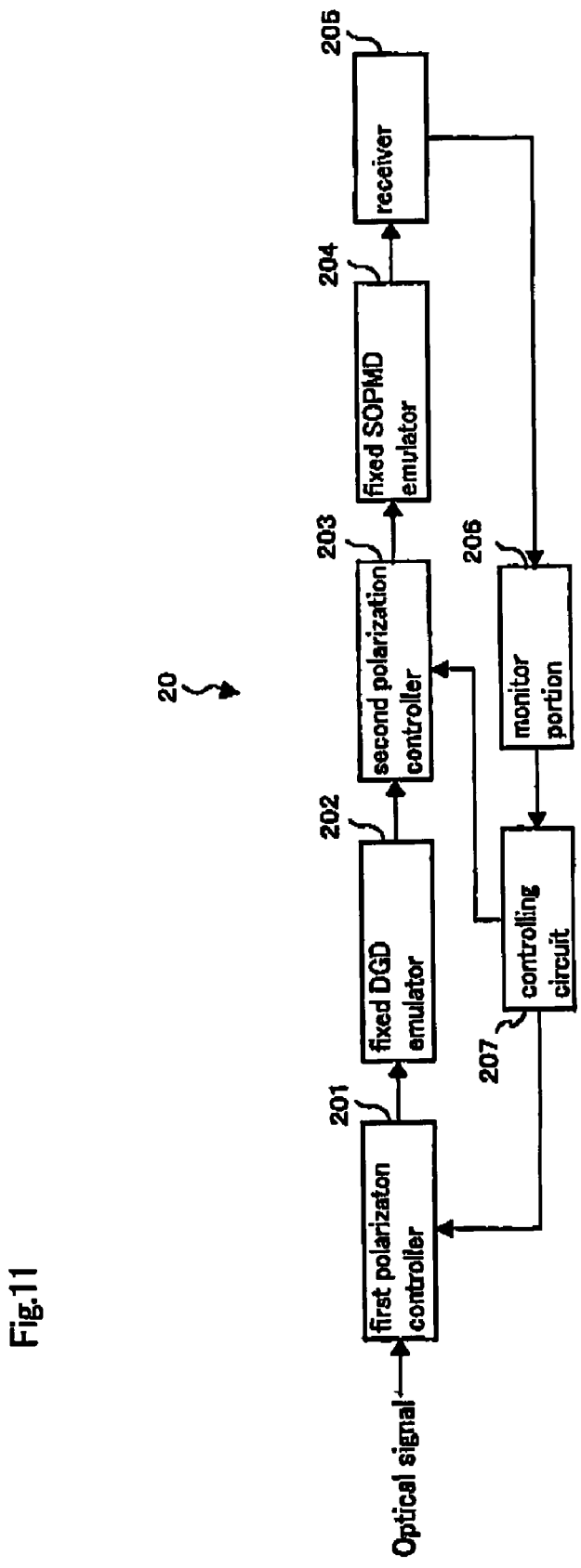
FIG. 11 is a view illustrating a configuration of a PMD compensator according a second embodiment to which the present invention is applied.

Next, FIG. 11 shows a configuration of a PMD compensator 20 according to a second embodiment to which the present invention is applied. In the first embodiment as described above, the configuration is made such that the fixed second-order PMD vector $\Omega C'$ is controlled in the vertical plane of the fixed first-order PMD vector $\Omega C$. The configuration in the second embodiment allows higher degree of freedom in controlling the second-order PMD vector. Specifically, as shown in FIG. 11, the PMD compensator 20 according to the second embodiment is configured to include a first polarization controller 201, a fixed DGD emulator 202, a second polarization controller 203, a fixed SOPMD emulator 204, a receiver 205, a monitor portion 206 and a controlling circuit 207.

In the PMD compensator illustrated in FIG. 11, an optical signal input via the same transmission line as that of the first embodiment is subjected to polarization conversion by the first polarization controller 201 to be fed into the fixed DGD emulator 202. This fixed DGD emulator 202 is an element having only a fixed first-order PMD component, which serves as the first fixed PMD emulator of the present invention.

Then, The light signal output from the fixed DGD emulator 202 is subjected to polarization conversion by the second polarization controller 203 to be fed into the fixed SOPMD emulator 204. This fixed SOPMD emulator 204 is an element only having a second-order PMD component, which serves as the second fixed PMD emulator of the present invention. Here, the receiver 205 and the monitor portion 206 of the PMD compensator 20 have same functions as those of the first embodiment.

With such a configuration, the PMD compensator 20 according to the second embodiment enables the fixed second-order PMD vector to be directed in a desired direction, without restrictions imposed by the first-order PMD vector. Accordingly, canceling effect of the second-order PMD by the PMD compensator 20 can be enhanced.

Figure 12:
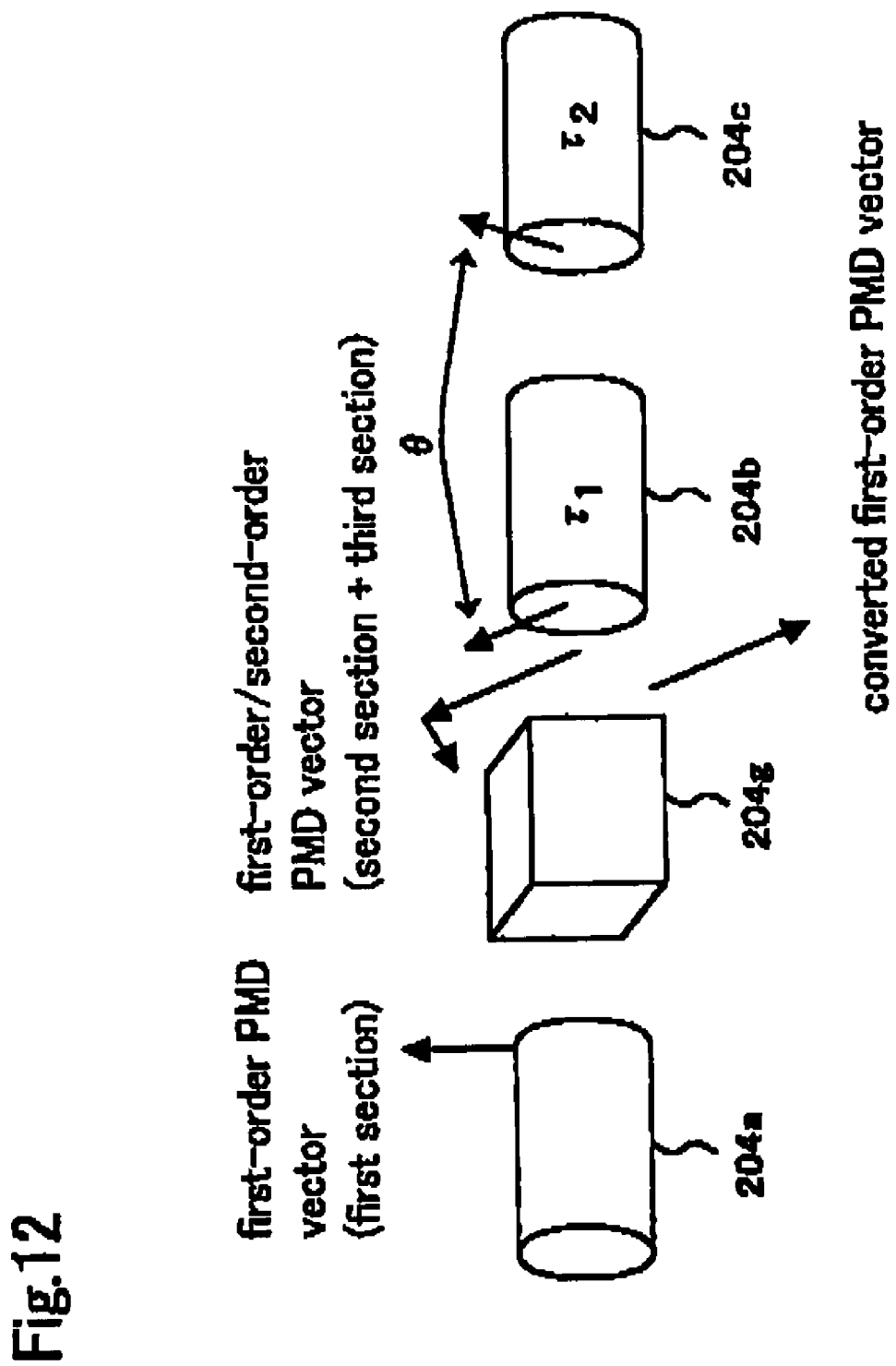
FIG. 12 is a view illustrating a first configuration example of the fixed SOPMD emulator according to the second embodiment.
Figure 13:
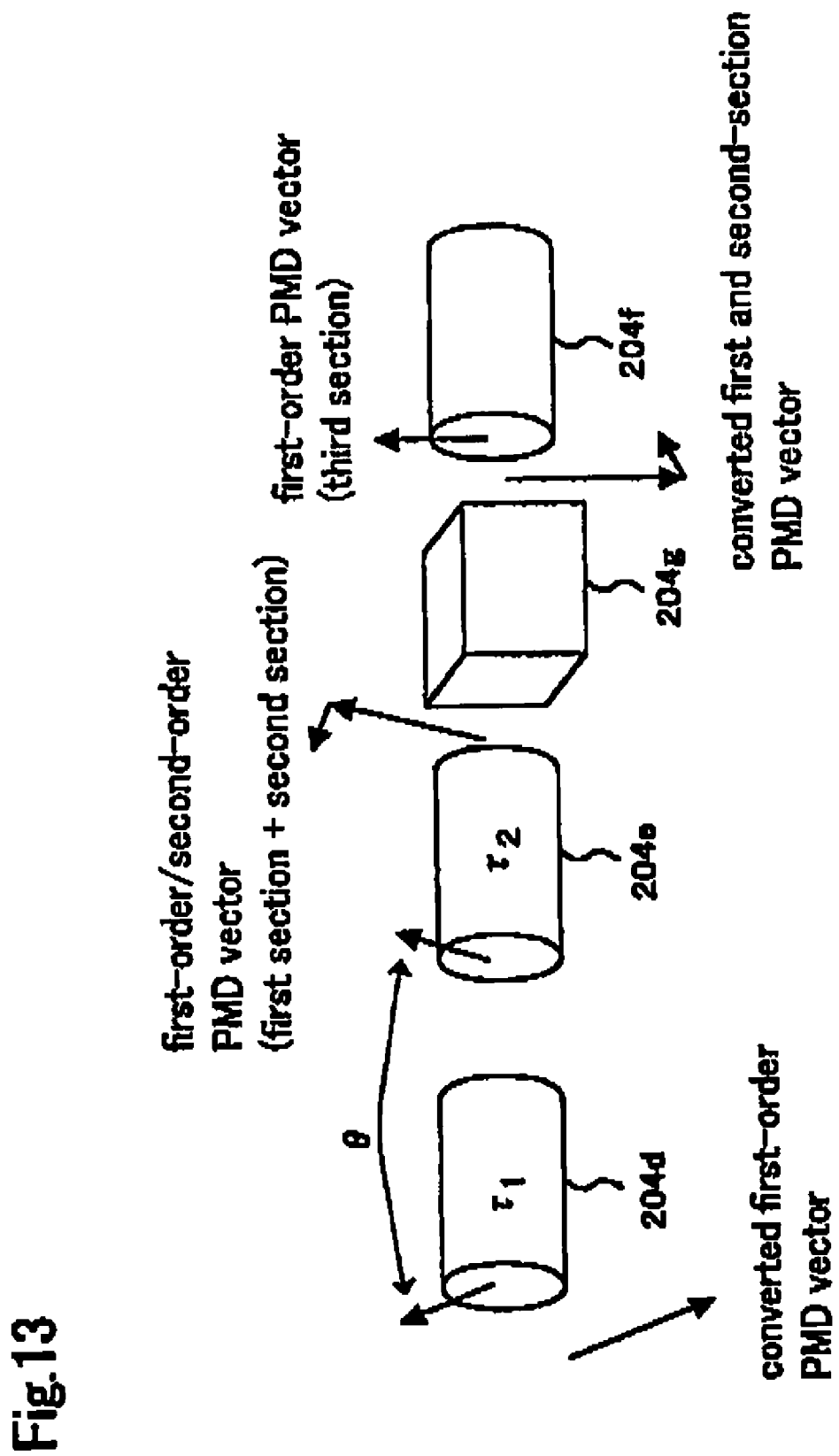
FIG. 13 is a view illustrating a second configuration example of the fixed SOPMD emulator according to the second embodiment.

Next description is made about a specific configuration of the above-mentioned DGD emulator 202 and fixed SOPMD emulator 204 in the second embodiment, with reference to FIGS. 12 and 13. First, the fixed DGD emulator 202 can be composed of a single PMF or uniaxial birefringent crystal. On the other hand, the fixed SOPMD emulator 204 can be configured with use of multi-step PMFs or uniaxial birefringent crystals, just as shown in FIG. 10 of the first embodiment. The fixed SOPMD emulator 204 can be configured minimally of three PMFs or uniaxial birefringent crystals. However, if they are spliced with a relative angle formed between the axes of the eigen states of polarization as described above, this is not enough to make a DGD of the whole system zero while a SOPMD remains.

Then, The fixed SOPMD emulator 204 is configured such that three elements 204a through 204c or three elements 204d through 204f such as PMFs or uniaxial birefringent crystals are spliced, and a fixed polarization converter 204g is disposed between either two of the spliced elements thereby to present a DGD of the whole system zero, which configuration is shown in FIG. 12 or 13. The fixed polarization converter 204g can be implemented by combining optical phase elements to have a predetermined polarization converting function.

FIG. 12 shows an example of the fixed SOPMD emulator 204 in which a first step element 204d, a second step element 204e, a fixed polarization converter 204g and a third step element 204f are arranged in this order. FIG. 13 shows an example of the fixed SOPMD emulator 204 in which a first step element 204a, a second step element 204b, a fixed polarization converter 204g and a third step element 204c are arranged in this order. In both of the configurations, as shown by PMD vectors on FIGS. 12 and 13, the fixed SOPMD emulator 204 operates to cancel a DGD totally.

Then, when there occurs large temperature change in the above-mentioned fixed SOPMD emulator 204, this causes phase fluctuations between two eigen polarization modes in each PMF or uniaxial birefringent crystal, and the direction of the first-order PMD vector and the direction of the second-order PMD vector may be sometimes changed. Accordingly, in order to reduce such an influence of temperature change, it is necessary to maintain the temperature of the fixed PMD emulator 204 constant.

Figure 14:
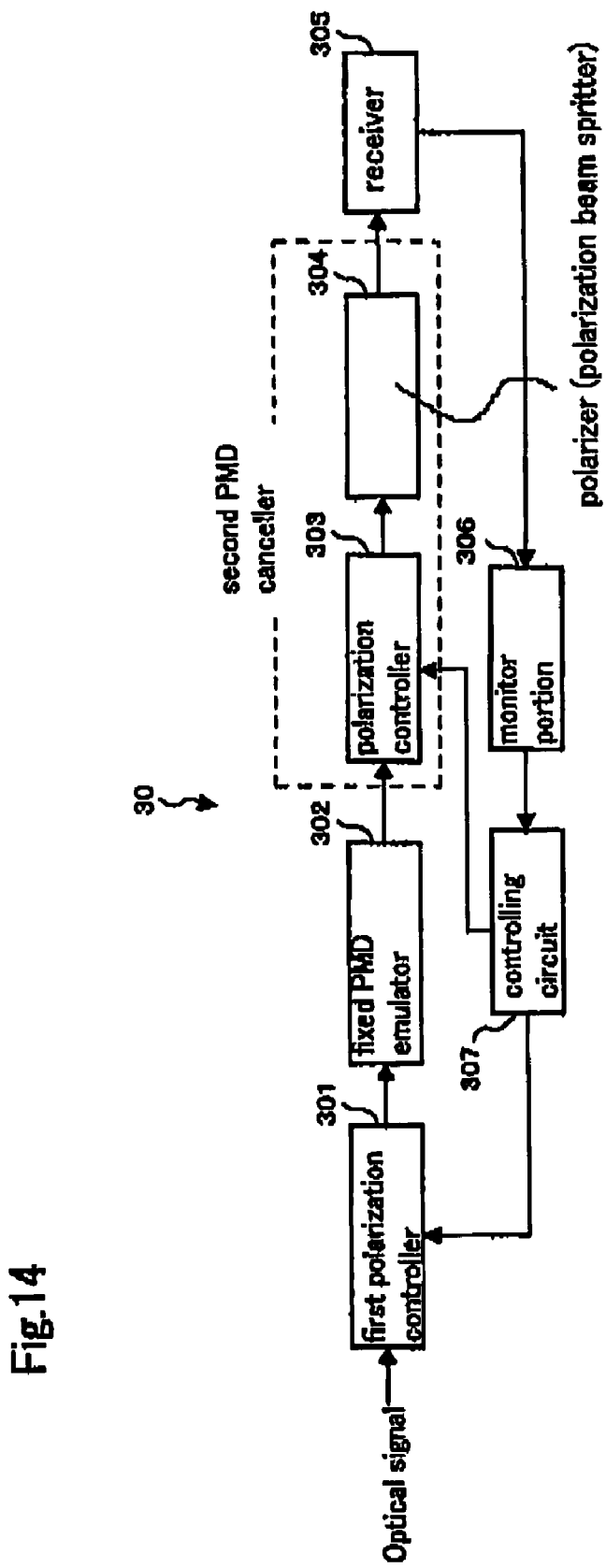
FIG. 14 is a block diagram illustrating a configuration of a PMD compensator according to a modification of the present invention.

FIG. 14 shows a configuration of a PMD compensator 30 according to a modification of the present invention. The PMD compensator 30 on FIG. 14 includes a polarization controller 301, a fixed PMD emulator 302, a polarization controller 303, a polarizer (polarization beam splitter) 304, a receiver 305, a monitor portion 306 and a controlling circuit 307. In this modification, the one polarization controller 303 and the one polarizer (polarization beam splitter) 304 serve as one PMD canceller, which can be combined to be arranged at the latter part of the compensator, thereby to enhancing the effect of compensating for the second PMD. The monitor portion may be configured to monitor the intensity of a light beam from the polarization beam splitter.

The present invention described up to this point is not limited to the above-described embodiments and can be modified in various ways. For example, members for configuring a fixed PMD emulator 102 of the first embodiment, a fixed DGD emulator 202 and a fixed SOPMD emulator 204 in the second embodiment and a way of combining them can be freely selected as far as they can present similar functions.

Further, the embodiments described up to now are such that the effect of canceling second-order PMD is simply added to a simple PMD compensator (PMDC) including a basic first-order PMD compensating portion (fixed DGD (Differential Group Delay) emulator) and one polarization controller, or particularly, the above-mentioned PMDC further including a DOP (Degree Of Polarization) monitor (cited reference [4] (F. Roy et al., OFC' 99, TuS4-1, p. 275, 1999)). Next description is made about an optimal DGD for a transmission line to which the basic simple PMDC portion is applied.

With use of the concept of a PMD vector, this PMDC serves in Principal State of Polarization (PSP) transmission. In other words, the PMDC performs compensation by aligning the PSP (direction of the PMD vector) of the whole transmission line including the PMDC with the direction of the state of polarization (SOP) of the incident signal light. In order that the PMD vector is directed to any possible direction of the SOP of incident light signal, a DGD emulator of the PMDC must have a DGD amount more than the DGD of the transmission line (refer to cited reference [4]). However, in consideration of second-order PMD, the potential maximum of DGD from the statistical distribution is not always an optimal DGD amount of the DGD emulator of the PMDC.

The present invention relating to the PMDC and the optical communication system is configured to be (1) a PMDC including a DGD emulator which has an optimal DGD amount, (2) a method for applying the PMDC to an optical communication system and (3) an optical communication system to which a PMDC with a DGD emulator having an optical DGD amount is applied.

Figure 15A:
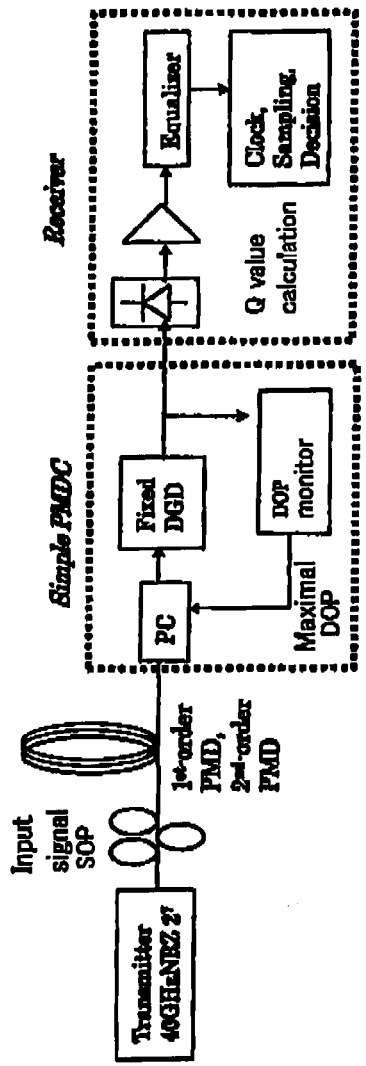
FIGS. 15A, 15B and 15C are diagrams illustrating an optical communication system according to an embodiment of the present invention.
Figure 15C:
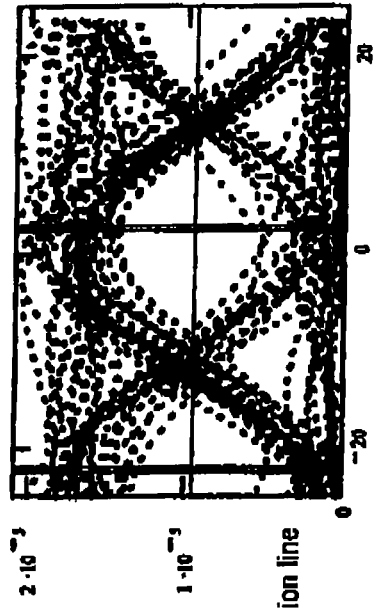
Figure 15B:
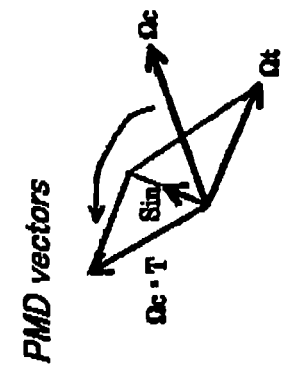

FIGS. 15A, 15B and 15C show an optical communication system according to the present invention. For example, an input signal is $2^7$ pseudo random bit pattern of NRZ, 40G bps, having a wavelength of 1,550 nm and extinction ratio of 13 dB. Since the second-order PMD varies depending on the relationship between the SOP of an input signal and the PSP of the whole system, the SOP of the input signal is made scrambled. An optical transmission line conforms to a model of the cited reference [1] (F. Bruyere, Optical fiber Tech., 2 pp. 269-280, 1996), being composed of a phase shift matrix with a Jones Matrix of the transmission line and frequency dependence of the DGD taken into consideration and a rotational matrix with frequency dependence of the PSP taken into consideration. The former contains a DGD which is the first-order PMD and a PCD (Polarization-dependent Chromatic Dispersion) component which is a part of the second-order PMD while the latter contains frequency dependence of the PSP which is a part of the second-order PMD. A simple PMDC includes one PC (polarization controller), one DGD emulator and a DOP monitor and operates as shown in FIG. 15B. Specifically, the PC performs polarization conversion such that it becomes the maximal DOP. A receiver conforms to a basic model described in the cited reference [7] (S. D. Personick, Bell Syst. Technol. J., 52(6), pp. 843-886, 1973). Simulations shown here ignore optical noise and transmittance of the transmission line.

Figure 16A:
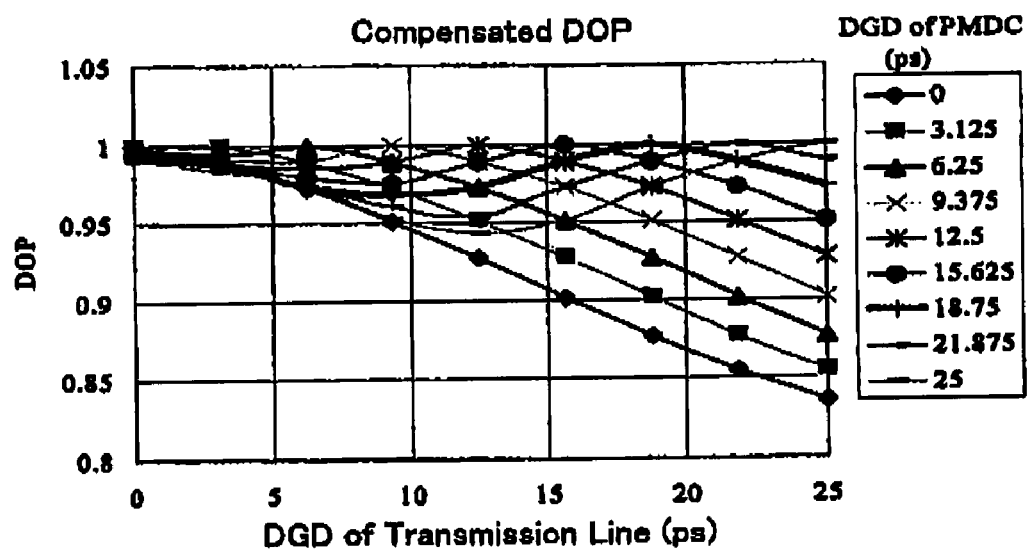
FIGS. 16A and 16B are plots of DOP and Q value compensated by a polarization mode dispersion compensator with different DGD emulators for various transmission line DGDs.
Figure 16B:
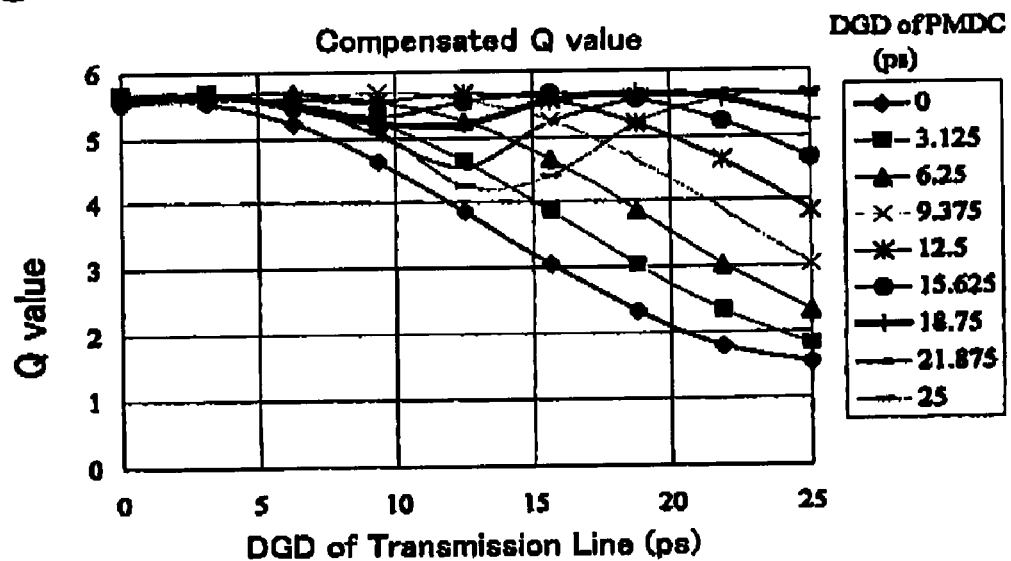
Figure 17:
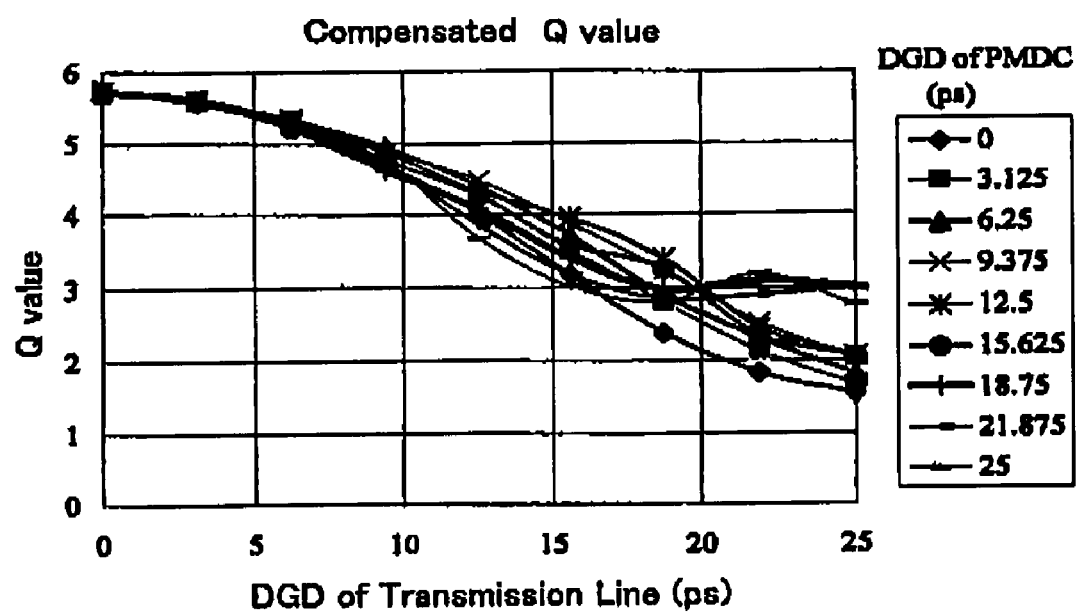
FIG. 17 is a plot of Q values compensated by polarization mode dispersion compensator which includes different DGD emulators for various DGDs in a transmission line where second-order PMD exists.

First, it is assumed that there is only a DGD in the transmission line. When the DGD has a dispersion of 0 through 25 ps, Q values compensated by the PMDC having some different DGD amounts are calculated for all incident SOPs. FIGS. 16A and 16B show results of calculating DOPs and Q values corresponding to the respective DGD amounts (τL) of the transmission line, for various DGD amounts (τC) of the DGD emulator of the PMDC. Here, the DOPs and the Q values shown in FIGS. 16A and 16B represent respective small values for the incident SOPs.

Variation of the Q value is well matched to that of the DOP, which shows that the DOP represents the penalty of deterioration in transmission characteristics caused by the PMD. When τC and τL are 25 ps and 12.5 ps, respectively, the Q value presents a serious deterioration because of the influence of the second-order PMD. Since this deterioration is also shown in the DOP graph, it is apparent that the influence of the second-order PMD can be monitored by the DOP. In this case, the second-order PMD increases in proportion as the τC and τL increase (cited reference 8: N. Gisin et al., Optics Communications, 89, pp. 316-323, 1992). In the case of τC=τL, if their axes of eigen states of polarization are orthogonal to each other, both of the first-order PMD and the second-order PMD become zero, and therefore, the Q value presents no deterioration. It is needless to say that if τC is too small, τL can not be completely compensated for, and therefore, the Q value presents deterioration.

The optimal τC for the highest one out of the respective lowest Q values is approximately 18.75 ps, and when the DGD distribution range is 0 to 25 ps and the maximum is set as T=25 ps, the optimal τC is expressed by 0.75 T. Likewise, even when the horizontal axis of the graph on FIG. 16B ranges from 0 to 20 ps and the DGD at more than 20 ps is neglected, the optimal τC is in the vicinity of 15.625 ps. When the maximum is set as T=20 ps, 0.75-times of the maximum T (0.75 T) is 15 ps, which means that the same as described above holds true for this case.

Next calculations are made about the case in which second-order PMD is added. Selected as a value of the second-order PMD is a root mean square (rms) as a representative value. When it is assumed that a DGD distribution ranges 0 to 25 ps, a mean DGD of the transmission channel is 10 ps. Accordingly, rms values of two components of the second-order PMD, PSP rotation K and DGD frequency differentiation τω, are 7.2 ps and 22.7 ps2, respectively (cited reference 9: L. E. Nelson et al., Photon, Technol. Letter., 11(12), P. 1614, 1999). FIG. 7 shows calculation results of compensated Q values on the condition that the values K and τω are given to the transmission line and τC varies depending on τL as is the case of FIG. 16B. When τL is a large value, the Q value is not compensated well due to the effect of the values K and τω, as compared with the case of FIG. 16B. However, the optimal DGD value τC is in the vicinity of 18.75 ps as was expected. If the range of the DGD distribution becomes smaller, the values K and τω also become smaller. Accordingly, when considering that when the second-order PMD value becomes smaller, the tendency of only DGD case (FIG. 16B) becomes outstanding, the optimal DGD amount of the simple PMDS can be 0.75 T in all cases.

These results can be applied to a plurality of embodiments according to the present invention which utilizing a second-order PMD canceller.

If these results are applied to an actual optical communication system, first, it is necessary to statistically measure PMD characteristics of a transmission line (optical fiber) of the system. Then, DGD distribution is used to determine a maximal DGD value. In accordance with these results, an optimum of DGD that should be installed is determined in accordance with the above-mentioned definition (maximal DGD=0.75).

Up to this point we has defined in the present invention the maximum 0.75 in the DGD distribution of the transmission line in which the first-order PMD and the second-order PMD exist as a DGD value of a DGD emulator installed in a PMDC. We have also shown a method of determining its maximal DGD value. According to the present invention, a simple and inexpensive PMDC is optimally applicable to an optical communication system.

INDUSTRIAL APPLICABILITY

As is clear from the above description, a polarization mode dispersion compensator according to the present invention is simple in configuration for detecting a control amount, fast in response speed, low in cost, and is allowed to compensate for not only a first-order polarization mode dispersion but also a second-order polarization mode dispersion.

In addition, a polarization mode dispersion compensating method according to the present invention is easy in detecting a control amount, fast in response speed, and is allowed to compensate for not only a first-order polarization mode dispersion but also a second-order polarization mode dispersion.

Further, according to the present invention, it is possible to realize a polarization mode dispersion compensator that is simple in configuration and easy in control, and to provide a polarization mode dispersion compensator that has enhanced effect of canceling not only a first-order polarization mode dispersion but also a second-order polarization mode dispersion.

Furthermore, according to the present invention, it is possible to apply all polarization mode dispersion compensators having a fixed DGD emulator to an optical transmission line.

The invention claimed is:

1. A polarization mode dispersion compensator for compensating for polarization mode dispersion that occurs in an optical signal propagating along a transmission line, comprising:
    a polarization controller for performing polarization conversion on the optical signal input via the transmission line;
    a fixed PMD (Polarization Mode Dispersion) emulator including a fixed first-order PMD component and a fixed second-order PMD component;
    monitoring means for monitoring a state of the optical signal output from said fixed PMD emulator; and
    controlling means for controlling said polarization controller based on a feedback signal from said monitoring means,
    wherein said fixed PMD emulator generates and adds a fixed first-order PMD and a fixed second-order PMD to the optical signal which is polarization converted by said polarization controller.

2. The polarization mode dispersion compensator as claimed in claim 1, wherein said fixed PMD emulator is configured by a plurality of polarization maintaining fibers or uniaxial birefringent crystals coupled with a relative angle formed between axes of eigen states of polarization of the polarization maintaining fibers or the uniaxial birefringent crystals.

3. The polarization mode dispersion compensator as claimed in claim 1, wherein a second PMD canceller including one polarization controller and one polarizer or polarization beam splitter is arranged at a latter part of the polarization mode dispersion compensator.

4. The polarization mode dispersion compensator as claimed in claim 1, further comprising a fixed PMD emulator having an optimal fixed first-order PMD and an optimal fixed second-order PMD which statistically exhibit optimal behavior based on a probability density distribution of the polarization mode dispersion of the transmission line.

5. An optical communication system comprising:
    a polarization controller for performing polarization conversion on the optical signal input via the transmission line;
    a fixed PMD (Polarization Mode Dispersion) emulator including a fixed first-order PMD component and a fixed second-order PMD component;
    monitoring means for monitoring a state of the optical signal output from said fixed PMD emulator; and
    controlling means for controlling said polarization controller based on a feedback signal from said monitoring means,
    wherein said fixed PMD emulator generates and adds a fixed first-order PMD and a fixed second-order PMD to the optical signal which is polarization converted by said polarization controller.

* * * * *